United States Patent
Yu et al.

(10) Patent No.: US 10,619,108 B2
(45) Date of Patent: Apr. 14, 2020

(54) METHOD FOR SIMULATED MOVING BED TO ADSORB AND SEPARATE POLYCYCLIC AROMATIC HYDROCARBONS

(71) Applicants: CNOOC TIANJIN CHEMICAL RESEARCH & DESIGN INSTITUTE CO. LTD, Tianjin (CN); CHINA NATIONAL OFFSHORE OIL CORP., Beijing (CN); CNOOC ENERGY TECHNOLOGY & SERVICES LIMITED, Beijing (CN)

(72) Inventors: Haibin Yu, Tianjin (CN); Jiazhong Zang, Tianjin (CN); Bin Li, Tianjin (CN); Jingxin Fan, Tianjin (CN); Chang Shu, Tianjin (CN); Zhiyu Sui, Tianjin (CN); Xunzhi Zhao, Tianjin (CN); Yueqiu Pan, Tianjin (CN); Yan Liu, Tianjin (CN); Hong Cheng, Tianjin (CN); Jian Li, Tianjin (CN)

(73) Assignees: CNOOC TIANJIN CHEMICAL RESEARCH & DESIGN INSTITUTE CO. LTD., Tianjin (CN); CHINA NATIONAL OFFSHORE OIL CORP., Beijing (CN); CNOOC ENERGY TECHNOLOGY & SERVICES LIMITED, Beijing (CN)

(*) Notice: Subject to any disclaimer, the term of this patent is extended or adjusted under 35 U.S.C. 154(b) by 17 days.

(21) Appl. No.: 16/061,032

(22) PCT Filed: Feb. 10, 2017

(86) PCT No.: PCT/CN2017/073196
§ 371 (c)(1),
(2) Date: Jun. 11, 2018

(87) PCT Pub. No.: WO2017/097271
PCT Pub. Date: Jun. 15, 2017

(65) Prior Publication Data
US 2018/0362859 A1    Dec. 20, 2018

(30) Foreign Application Priority Data
Dec. 11, 2015   (CN) .......................... 2015 1 0921075

(51) Int. Cl.
*C10G 25/08*   (2006.01)
*B01D 15/02*   (2006.01)
(Continued)

(52) U.S. Cl.
CPC ............. *C10G 25/08* (2013.01); *B01D 15/02* (2013.01); *C10G 25/03* (2013.01); *C10G 53/08* (2013.01);
(Continued)

(58) Field of Classification Search
CPC ........ C10G 25/02; C10G 25/03; C10G 25/08; C10G 25/11; C10G 53/08
See application file for complete search history.

(56) References Cited

U.S. PATENT DOCUMENTS

| 4,455,444 A | 6/1984 | Kulprathipanja et al. |
| 5,177,295 A * | 1/1993 | Oroskar ............ C07C 7/13 585/805 |

(Continued)

FOREIGN PATENT DOCUMENTS

| CN | 1800309 A | 7/2006 |
| CN | 104511184 A | 4/2015 |

(Continued)

OTHER PUBLICATIONS

International Search Report dated May 22, 2017 from corresponding PCT/CN2017/073196, pp. 2.

*Primary Examiner* — Renee Robinson
(74) *Attorney, Agent, or Firm* — Dragon Sun Law Group; Jinggao Li, Esq.

(57) ABSTRACT

The present disclosure relates to a method for a simulated moving bed to adsorb and separate polycyclic aromatic
(Continued)

hydrocarbons. Zeolite, metal oxide and metal-modified materials are employed as adsorbent. Firstly, diesel oil flows through pre-treatment adsorbent to remove the trace amount of impurities. Secondly, the purified diesel oil flows through the simulated moving bed so that the PAHs can be separated from diesel oil. In this process, the valves are switched periodically, leading to the relative movement of adsorption beds. At the same time, desorbent is pumped into the equipment to wash out PAHs, achieving the continuous adsorption-regeneration operation. Thirdly, simple distillation is employed to separate desorbent from clean diesel oil and PAHs, respectively. Finally, the fractions of clean diesel oil and PAHs can be obtained, respectively. The separated desorbent can be recycled. The PAHs removal rate can reach to 90%.

6 Claims, 1 Drawing Sheet

(51) Int. Cl.
  *C10G 25/03* (2006.01)
  *C10G 53/08* (2006.01)

(52) U.S. Cl.
  CPC .. *B01D 2253/104* (2013.01); *B01D 2253/108* (2013.01); *B01D 2256/24* (2013.01); *B01D 2257/7027* (2013.01); *C10G 2300/1055* (2013.01); *C10G 2300/1096* (2013.01); *C10G 2400/04* (2013.01); *C10G 2400/30* (2013.01)

(56) References Cited

U.S. PATENT DOCUMENTS

| | | | |
|---|---|---|---|
| 2006/0115421 A1* | 6/2006 | Leflaive | B01D 15/00 |
| | | | 423/702 |
| 2006/0131217 A1 | 6/2006 | Nicolaos et al. | |
| 2007/0149841 A1 | 6/2007 | Lee et al. | |
| 2008/0105595 A1* | 5/2008 | Koseoglu | C10G 25/00 |
| | | | 208/91 |

FOREIGN PATENT DOCUMENTS

| | | |
|---|---|---|
| CN | 105542835 | 5/2016 |
| CN | 105542835 A | 5/2016 |

* cited by examiner

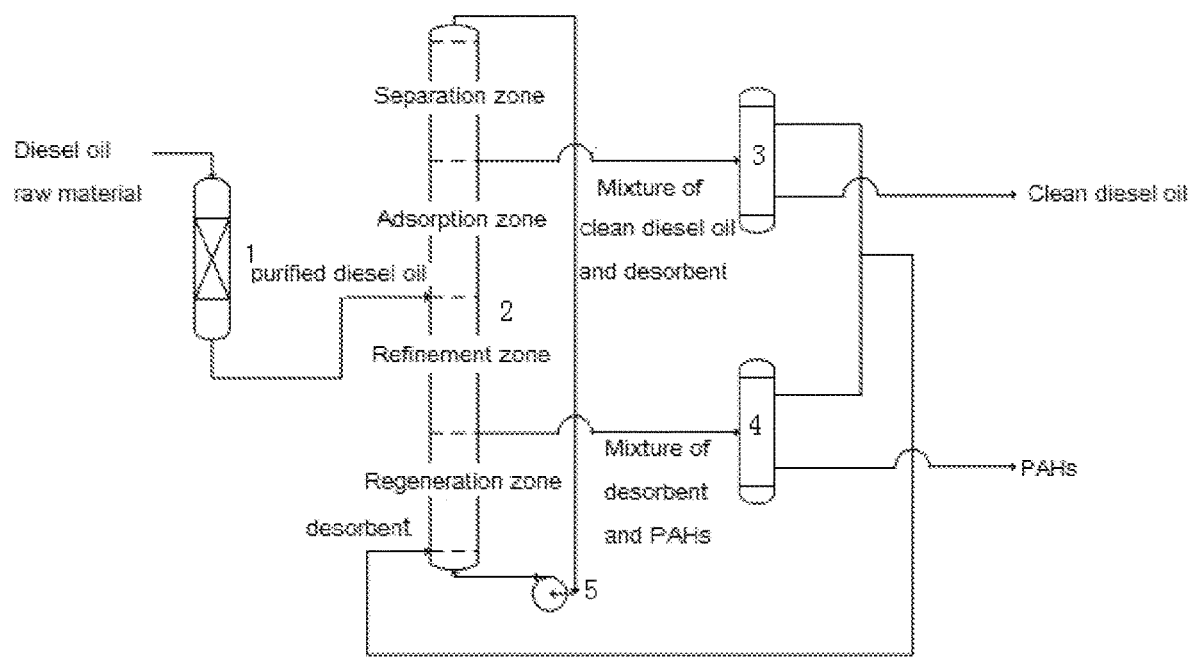

METHOD FOR SIMULATED MOVING BED TO ADSORB AND SEPARATE POLYCYCLIC AROMATIC HYDROCARBONS

CROSS-REFERENCE TO RELATED APPLICATIONS

This application is a national stage application of International Patent Application PCT/CN2017/073196, filed Feb. 10, 2017, which itself claims the priority to Chinese Patent Application No. 201510921075.8, filed Dec. 11, 2015 in the State Intellectual Property Office of P.R. China, both of which are expressly incorporated by reference herein in their entirety.

FIELD OF THE DISCLOSURE

The present disclosure relates to an adsorption process of separating polycyclic aromatic hydrocarbon on simulated moving bed.

BACKGROUND OF THE DISCLOSURE

Polycyclic aromatic hydrocarbons (PAHs) are a sort of chemicals structured with binary or multiple aromatic rings, which includes naphthalene, methylnaphthalene, dimethyl naphthalene and etc. PAHs are prevalent in diesel. However, their cetane values are so low that PAHs can hardly combust completely. Moreover, PAHs in the diesel mainly lead to smoke emission of off-gas. According to GB19147-2013, the PAHs content in the automotive diesel oil is limited to 11%. Whereas, PAHs content in the diesel, produced from industrial units operation such as catalytic cracking and coking, is far more than 11%.

For high-PAH-content diesel, especially catalytic cracking diesel, there is a hydroconversion process claimed in CN1156752A. In CN1156752A disclosure, the catalysts containing zeolite are employed in hydroconversion. Two-stage hydrogenation process is utilized for dearomatization, desulfidation and upgrading cetane value. In specific conditions, the catalysts have ring-opening catalytic activity and no activity on cracking reactions. The cetane value of processed diesel will increase by more than 10 units, upgrading the quality of diesel remarkably.

Solvent extraction is also feasible to separate PAHs from diesel. A typical process is disclosed in CN103214332B. In CN103214332B disclosure, amine, ether and ionic liquid are employed as solvent for extraction. Majority of strongly polar PAHs in the diesel can be removed after multi-stage extraction, leading to a huge rise of cetane value. With this method processed, after four-stage extraction, PAHs content in the diesel can decrease to 7% and the removal rate of PAHs can reach to 70%. The processed diesel, generated from catalytic cracking, can be used as raw material of national III diesel.

Besides, adsorption is another feasible way to separate PAHs from diesel.

There is an adsorbent and its preparation method claimed in CN102908991B, which can separate naphthalene from organic gas via adsorption. This adsorbent is supported with activated carbon. A small amount of hexadecyl trimethyl ammonium bromide or aluminum chloride is loaded as assistant. With this adsorbent, the naphthalene in the organic gas can decrease to 45 mg/g under the conditions of maximum pressure 3 MPa and maximum temperature 50° C.

Currently, hydrogenation and solvent extraction are prevalent in the separation PAHs from diesel. However, hydrogenation has disadvantages of high energy consumption and high equipment investment while solvent extraction has disadvantages of long process flow and high energy consumption. Due to disadvantages mentioned above, the current cost of upgrading diesel is high. Hence, the selective adsorption separation of PAHs will be an important complement for diesel-upgrading technologies.

SUMMARY

In order to overcome the defects of current technologies, the present disclosure provides a method for simulated moving bed to absorb and separate PAHs from diesel effectively.

The method for simulated moving bed to absorb and separate PAHs includes procedures as follow:

1) the diesel oil with trace impurities is pretreated in an adsorption column; a trace amount of colloid, sulfide, nitride and other impurities can be removed under the operation conditions which are 0.1~1.5 MPa and 30~150° C. to obtain the purified diesel, wherein the adsorbent in pretreatment process is X zeolite, Y zeolite, silica colloid, alumina or metal-modified adsorbent;

2) the purified diesel flows into simulated moving bed adsorption equipment in which PAHs adsorbent are loaded; the said simulated moving bed adsorption equipment is structured with multiple adsorption beds in series, and these adsorption beds are connected with circulating pump form a closed loop; these adsorption beds are divided into four areas; long the flow of diesel, the said four areas are adsorption zone, separation zone, refinement zone and regeneration zone in sequence; the bed allocated numbers for each zone is not less than 1, and the allocation proportions of each zone are the same or not, PAHs adsorbent is employed to absorb the PAHs so as to produce clean diesel oil in adsorption zone; in regeneration zone, desorbent is employed to displace the PAHs out of absorbent so as to regenerate the absorbent; the adsorption zone and regeneration zone are separated with the separation zone; the refinement zone is employed to purify the product;

3) six material stream pipelines and corresponding automatic control valves are set in every bed of the said simulated moving bed; wherein the six material stream pipelines correspond respectively to the raw material of diesel oil, desorbent, clean diesel oil component, PAHs component, circulated component and washing component; continuous adsorption-regeneration process in the simulated moving bed can be achieved via switching the valves on the material stream pipeline periodically; desorbent can be recycled from product with distillation, and the final products include clean diesel oil and PAHs are obtained;

Wherein the said PAHs adsorbent is MCM-41, silica gel, alumina or metal-modified adsorbent which having ability of selectively adsorbing; the metal used for modification is one or more of Mg, Ba, Al, K, Cu, Ag, Cr, Zn, Co and Ni;

the desorbent is one or more of cyclohexane, methylcyclohexane, xylene, toluene, benzene and ethanol.

In the present disclosure, the preferred metal used for modification adsorbent includes one or more of Mg, K, Cu, Ag and Ni;

In the present disclosure, the preferred pre-treatment temperature is 40~120° C., the preferred pre-treatment pressure is 0.3~1.0 MPa, and the preferred adsorption weight hourly space velocity is 0.5~1.5 $h^{-1}$.

In the present disclosure, the preferred cycle of switching valves is 100~1500 s.

In the present disclosure, the temperature of adsorbent bed is 30~200° C., the preferred temperature is 40~150° C., the preferred adsorption pressure is 0.1~2.0 MPa, and the preferred pressure is 0.5~1.5 MPa.

In the present disclosure, the mass velocity ratio of raw diesel oil to desorbent is 1:1~1:3, fourthly preferred mass velocity ratio is 1:1.2~1:2.5; the mass velocity ratio of raw diesel oil to circulation is 1:0.8~1:4, and the preferred mass velocity is 1:1~1:3.

The method for simulated moving bed to absorb and separate PAHs, in which metallic oxides or modified metallic oxides are employed as the adsorbent of PAHs, and accessible solvents are employed to desorb PAHs from adsorbent, can separate PAHs from diesel oil effectively. Continuous adsorption-desorption process can be achieved with present adsorption process on the simulated moving bed. The simulated moving bed disclosed in the present disclosure are structured with multiple adsorption beds, the preferred number of which is 8~24. There are six material stream pipelines and corresponding automatic control valves in each bed. They correspond to stream of raw material, desorbent, clean diesel oil, PAHs, circulated component, washing component, respectively. The switching of valves can be controlled with programs so that the adsorbent's relative moving over raw diesel oil can be achieved. Thus, PAHs can be removed from diesel oil via continuous adsorption process, obtaining hyper-clean diesel oil and PAHs, respectively.

Compared with current high pressure hydrogenation process for removing PAHs, this disclosure has the following advantages:

1) the adsorption separation process on the simulated moving bed is a non-hydrogen green process, there is no hydrogen consumption and emission during the whole process;

2) in the present disclosure, PAHs can be separated from diesel oil under low temperature and pressure. Thus, the quality of diesel oil can be upgraded with a low equipment investment;

3) clean diesel oil can be obtained after selective adsorption separation of PAHs, besides, a proportion of heavy aromatics will be gained from the process, which can be used as raw material of BTX (benzene Toluene and xylene);

4) this disclosure has the features of low operation temperature, low operation pressure, continuous operation, low adsorbent abrasion and high removal rate of PAHs.

BRIEF DESCRIPTION OF THE DRAWINGS

The sole FIGURE is a schematic diagram illustrating the process of the present disclosure for adsorbing and separating polycyclic aromatic hydrocarbons on simulated moving bed.

Wherein 1 shows pre-treatment adsorption column, 2 shows four-zone simulated moving bed adsorption column, 3 shows distillation column for clean diesel oil, 4 shows distillation column for PAHs, and 5 shows circulating pump.

DETAILED DESCRIPTION OF THE DISCLOSURE

The process parameters for adsorption process on the simulated moving bed and two kinds of adsorbents are included in the present disclosure. The purposes of mentioned adsorbents include diesel oil pre-treatment and the adsorption of PAHs. The adsorbent of diesel oil pre-treatment includes X zeolite, Y zeolite, silica gel, alumina and metal-modified adsorbent, which can be one or more. The PAHs adsorbent includes metal-modified MCM-41 zeolite, silica gel and alumina, which can be one or more.

The simulated moving bed process in the present disclosure can run under the conditions disclosed in the present disclosure or typical ones claimed in U.S. Pat. No. 5,177,295 and CN200710022902.5. The preferred process parameters are claimed in the present disclosure.

In order to clarify present disclosure, the following FIGURE is employed to illustrate more details.

As shown in the FIGURE, firstly, the raw material of diesel oil flows into pre-treatment adsorption column 1, in which the pre-treatment adsorbent is employed to remove a trace of impurities from diesel oil. Secondly, purified diesel oil flows into four-zone simulated moving bed equipment 2. In equipment 2, purified diesel oil flows through the PAHs adsorbents to eliminate PAHs, obtaining clean diesel oil component. Thirdly, the mixture of clean diesel oil and desorbent flows into clean diesel oil distillation column 3, the clean diesel oil and desorbent are obtained respectively. Fourthly, the desorbent is employed to wash off the PAHs absorbed on the adsorption. The mixture of desorbent and PAHs is pumped into PAHs distillation column 4, obtaining PAHs and desorbent, respectively. Fifthly, desorbent flows into simulated moving bed for recycling. Setting the switching time of valves and switching these four zones in turn regularly, continuous adsorption-desorption process can be achieved.

The process disclosed in the present disclosure is explained with following examples. The examples are not limited to the following examples.

The diesel oil used in the examples is the refined diesel oil from a certain refinery. Its PAHs content is more than 11%, which is determined by GC and GC-MS. The refined diesel oil contains alkane, cycloalkane, monocyclic aromatic hydrocarbon, PAHs and etc.

Yield of clean diesel oil=mass of clean diesel oil/ mass of feeding diesel oil×100%

Removal rate of PAHs=(PAHs content of feeding diesel oil−PAHs content of clean diesel oil× Yield of clean diesel oil)/PAHs content of feeding diesel oil×100%

Aromatic content of PAHs=mass of aromatics in PAHs/total mass of PAHs×100%

EXAMPLE 1

(1) The copper-modified X zeolite is employed as the diesel oil pre-treatment adsorbent. Its silicon-to-aluminum ratio is 2.5 ($SiO_2/Al_2O_3$=2.5). Its CuO content is 1.21 wt %. The average aperture of diesel oil pre-treatment adsorbent is 2.31 nm. The specific surface area of diesel oil pre-treatment adsorbent is 498.72 cm$^2$/g. The pore volume of diesel oil pre-treatment adsorbent is 0.26 ml/g. The copper-modified silica gel is employed as the PAHs adsorbent. The purity of silica gel is 99.9%. The CuO content of copper-modified silica gel is 1.25 wt %. The average aperture of PAHs adsorbent is 10.22 nm. The specific surface area of PAHs adsorbent is 450.58 cm$^2$/g. The pore volume of PAHs adsorbent is 0.82 ml/g.

(2) The pre-treatment process conditions: in order to refine the diesel oil and protect subsequent adsorbent, diesel oil flows through the pre-treatment adsorption column so that the trace amount of colloid and impurities in the diesel oil are removed. The bed temperature of pre-treatment adsorption column is 40~60° C. The pressure of pre-treatment adsorption column is 0.8~1.0 MPa. The weight hourly space velocity of adsorbent is 1.0 h$^{-1}$.

(3) The process conditions of simulated moving bed: pre-treated diesel oil flow through simulated moving bed equipment structured with 16 adsorption beds. In the equipment, the pre-treated diesel oil flows through adsorption zone, separation zone, regeneration zone and refinement zone in order. The allotment numbers of adsorption zone, separation zone, regeneration zone and refinement zone are 4, 2, 4, 6, respectively. There are six material stream pipelines in every bed of simulated moving bed mentioned above. The six material stream pipelines correspond to the raw material of diesel oil, desorbent, clean diesel oil component, PAHs component, circulated component and washing component, respectively. Every material stream pipeline is controlled with a programmable valve. In these four zones, each bed is switched in turn along the flow of pre-treated diesel oil. The continuous adsorption separation process can be achieved via switching the valves periodically. In the present example, the set switching time is 200 s, the adsorption cycle is 3200 s, the temperature of adsorption bed is 80° C., the adsorption pressure is 0.6~0.8 MPa, the mass flow ratio of pre-treated diesel oil to desorbent is 1:1.8, and the mass flow ratio of pre-treated diesel oil to circulation is 1:2.5.

(4) PAHs and desorbent-containing clean diesel oil can be separated with the adsorption separation process on the simulated moving bed. Simple distillation is employed to separate desorbent from clean diesel oil and PAHs, respectively. It is because that the boiling point of desorbent differs considerably from those of diesel oil and PAHs. Finally, clean diesel oil, PAHs and desorbent can be obtained, respectively. Desorbent can be recycled. Clean diesel oil can be employed to blend commercial diesel oil. PAHs can be utilized as the raw material of BTX process to produce light aromatic hydrocarbon. The analytic data for each component are illustrated in the table 1.

(5) The used diesel oil in the present example is the hydrogenated diesel oil from a domestic refinery. Its PAHs content is 17.86%. The used desorbent is toluene.

EXAMPLE 2

(1) The copper-modified silica gel is employed as the diesel oil pre-treatment adsorbent. Its CuO content is 1.53 wt %. The average aperture of diesel oil pre-treatment adsorbent is 8.65 nm. The specific surface area of diesel oil pre-treatment adsorbent is 480.12 cm$^2$/g. The pore volume of diesel oil pre-treatment adsorbent is 0.69 ml/g. The magnesium-modified silica gel is employed as the PAHs adsorbent. The purity of silica gel is 99.9%. The MgO content of magnesium-modified silica gel is 0.86 wt %. The average aperture of PAHs adsorbent is 10.85 nm. The specific surface area of PAHs adsorbent is 421.56 cm$^2$/g. The pore volume of PAHs adsorbent is 0.85 ml/g (2) The pre-treatment process conditions: the bed temperature of pre-treatment adsorption column is 60~80° C. The pressure of pre-treatment adsorption column is 0.7~0.9 MPa. The weight hourly space velocity of adsorbent is 1.2 h$^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 3, 4, 5, respectively. In the present example, the set switching time is 150 s. The adsorption cycle is 2400 s. The temperature of adsorption bed is 80° C. The adsorption pressure is 0.6~0.8 MPa. The mass flow ratio of pre-treated diesel oil to desorbent is 1:2. The mass flow ratio of pre-treated diesel oil to circulation is 1:2.2.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The used desorbent is the mixture of toluene 50 wt %—cyclohexane 50 wt %.

EXAMPLE 3

(1) In the present example, the diesel oil pre-treatment adsorbent is the same as that in the example 1. The PAHs adsorbent is the same as that in the example 2.

(2) The pre-treatment process conditions: the bed temperature of pre-treatment adsorption column is 40~60° C. The pressure of pre-treatment adsorption column is 0.8~1.0 MPa. The weight hourly space velocity of adsorbent is 1.3 h$^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 4, 4, 4, respectively. In the present example, the set switching time is 120 s. The adsorption cycle is 1920 s. The temperature of adsorption bed is 85° C. The adsorption pressure is 0.6~0.8 MPa. The mass flow ratio of pre-treated diesel oil to desorbent is 1:2. The mass flow ratio of pre-treated diesel oil to circulation is 1:2.6.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The used desorbent is the mixture of toluene 50 wt %—benzene 50 wt %.

EXAMPLE 4

(1) In the present example, the diesel oil pre-treatment adsorbent is the same as that in the example 1. The PAHs adsorbent is the same as that in the example 2.

(2) The pre-treatment process conditions: the bed temperature of pre-treatment adsorption column is 40~60° C. The pressure of pre-treatment adsorption column is 0.8~1.0 MPa. The weight hourly space velocity of adsorbent is 1.4 h$^{-1}$.

(3) The process conditions of simulated moving bed: the simulated moving bed equipment is structured with 8 adsorption beds. In the equipment, the allotment numbers of adsorption zone, separation zone, regeneration zone and refinement zone are 2, 2, 2, 2, respectively. In the present example, the set switching time is 200 s. The adsorption cycle is 1600 s. The temperature of adsorption bed is 90° C. The adsorption pressure is 0.6~0.8 MPa. The mass flow ratio of pre-treated diesel oil to desorbent is 1:1.8. The mass flow ratio of pre-treated diesel oil to circulation is 1:2.7.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The used desorbent is benzene.

EXAMPLE 5

(1) In the present example, the diesel oil pre-treatment adsorbent is the same as that in the example 2. The PAHs adsorbent is the same as that in the example 1.

(2) The pre-treatment process conditions: the bed temperature of pre-treatment adsorption column is 60~80° C. The pressure of pre-treatment adsorption column is 0.8~1.0 MPa. The weight hourly space velocity of adsorbent is 1.0 $h^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 3, 4, 5, respectively. In the present example, the set switching time is 200 s. The adsorption cycle is 3200 s. The temperature of adsorption bed is 90° C. The adsorption pressure is 0.6~0.8 MPa. The mass flow ratio of pre-treated diesel oil to desorbent is 1:1.5. The mass flow ratio of pre-treated diesel oil to circulation is 1:1.9.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The used desorbent is the mixture of benzene 10 wt %—cyclohexane 90 wt %.

EXAMPLE 6

(1) In the present example, the diesel oil pre-treatment adsorbent is the same as that in the example 2. The PAHs adsorbent is the same as that in the example 1.

(2) The pre-treatment process conditions: the bed temperature of pre-treatment adsorption column is 60~80° C. The pressure of pre-treatment adsorption column is 0.8~1.0 MPa. The weight hourly space velocity of adsorbent is 1.0 $h^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 3, 4, 5, respectively. In the present example, the set switching time is 250 s. The adsorption cycle is 4000 s. The temperature of adsorption bed is 90~100° C. The adsorption pressure is 0.6~0.8 MPa. The mass flow ratio of pre-treated diesel oil to desorbent is 1:1.5. The mass flow ratio of pre-treated diesel oil to circulation is 1:1.8.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The Used desorbent is the mixture of benzene 50 wt % and toluene 50 wt %.

EXAMPLE 7

(1) The copper-modified silica gel is employed as the diesel oil pre-treatment adsorbent. Its CuO content is 1.53 wt %. The average aperture of diesel oil pre-treatment adsorbent is 2.34 nm. The specific surface area of diesel oil pre-treatment adsorbent is 530 $cm^2/g$. The pore volume of diesel oil pre-treatment adsorbent is 0.42 ml/g. The MCM-41 zeolite is employed as the PAHs adsorbent. The average aperture of PAHs adsorbent is 3.22 nm. The specific surface area of PAHs adsorbent is 725.21 $cm^2/g$. The pore volume of PAHs adsorbent is 0.92 ml/g (2) The pre-treatment process conditions: the bed temperature of pre-treatment adsorption column is 60~80° C. The pressure of pre-treatment adsorption column is 0.7~0.9 MPa. The weight hourly space velocity of adsorbent is 1.2 $h^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 3, 4, 5, respectively. In the present example, the set switching time is 150 s, the adsorption cycle is 2400 s, the temperature of adsorption bed is 80° C., the adsorption pressure is 0.6~0.8 MPa. The mass flow ratio of pre-treated diesel oil to desorbent is 1:2, and the mass flow ratio of pre-treated diesel oil to circulation is 1:2.2.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The used desorbent is the mixture of toluene 10 wt %—cyclohexane 90 wt %.

EXAMPLE 8

(1) In the present example, the diesel oil pre-treatment adsorbent is γ-$Al_2O_3$, and Magnesium modified X zeolite is employed as the PAHs adsorbent. The ratio of silicon to aluminum in the molecular sieve is $SiO_2/Al_2O_3$=2.5. Its MgO content is 1.21 wt %. The average aperture of PAHs adsorbent is 2.01 nm. The specific surface area of PAHs adsorbent is 518.72 $cm^2/g$. The pore volume of PAHs adsorbent is 0.31 ml/g.

(2) The pre-treatment process conditions: the bed temperature of pre-treatment adsorption column is 40~60° C. The pressure of pre-treatment adsorption column is 0.8~1.0 MPa. The weight hourly space velocity of adsorbent is 1.3 h$^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 4, 4, 4, respectively. In the present example, the set switching time is 120 s. The adsorption cycle is 1920 s. The temperature of adsorption bed is 85° C. The adsorption pressure is 0.6~0.8 MPa. The mass flow ratio of pre-treated diesel oil to desorbent is 1:2. The mass flow ratio of pre-treated diesel oil to circulation is 1:2.6.

(4) Simple distillation is employed to separate desorbent from clean diesel oil and PAHs, respectively. Finally, clean diesel oil, PAHs and desorbent can be obtained, respectively. The analytic data for each component are illustrated in the table 1.

(5) The used diesel oil in the present example is the hydrogenated diesel oil from a domestic refinery. Its PAHs content is 17.86%. The used desorbent is the mixture of toluene 50 wt %—benzene 50 wt %.

EXAMPLE 9

(1) The diesel oil pre-treatment adsorbent is the same as that in the example 2. The copper modified large-pore γ-Al$_2$O$_3$ is employed as the PAHs adsorbent. Its CuO content is 1.29 wt %. The average aperture of PAHs adsorbent is 10.28 nm. The specific surface area of PAHs adsorbent is 241.36 cm$^2$/g. The pore volume of PAHs adsorbent is 0.76 ml/g.

(2) The pre-treatment process conditions: the bed temperature of pre-treatment adsorption column is 60~80° C. The pressure of pre-treatment adsorption column is 0.8~1.0 MPa. The weight hourly space velocity of adsorbent is 1.0 h$^{-1}$.

(3) The process conditions of simulated moving bed: the simulated moving bed equipment is structured with 16 adsorption beds. In the equipment, the allotment numbers of adsorption zone, separation zone, regeneration zone and refinement zone are 4, 3, 4, 5, respectively. In the present example, the set switching time is 200 s. The adsorption cycle is 3200 s. The temperature of adsorption bed is 90° C. The adsorption pressure is 0.6~0.8 MPa. The mass flow ratio of pre-treated diesel oil to desorbent is 1:1.5. The mass flow ratio of pre-treated diesel oil to circulation is 1:1.9.

(4) Simple distillation is employed to separate desorbent from clean diesel oil and PAHs, respectively. Finally, clean diesel oil, PAHs and desorbent can be obtained, respectively. The analytic data for each component is illustrated in the table 1.

(5) The used diesel oil in the present example is the hydrogenated diesel oil from a domestic refinery. Its PAHs content is 17.86%. The used desorbent is cyclohexane.

The detailed separation process conditions and product composition are illustrated in table 1. It is indicated that the adsorption process mentioned in example 1~9 can remove PAHs from diesel oil effectively.

TABLE 1 the analytic results of separated product in each example

| | Example | | | | | | | | |
|---|---|---|---|---|---|---|---|---|---|
| | 1 | 2 | 3 | 4 | 5 | 6 | 7 | 8 | 9 |
| the partition of SMB | 4-2-4-6 | 4-3-4-5 | 4-4-4-4 | 2-2-2-2 | 4-3-4-5 | 4-3-4-5 | 4-3-4-5 | 4-4-4-4 | 4-3-4-5 |
| switching times | 200 | 150 | 120 | 200 | 200 | 250 | 150 | 120 | 200 |
| the composition of desorbent | toluene | 50% toluene 50% cyclohexane | 50% toluene 50% benzene | benzene | 10% benzene 90% cyclohexane | 50% toluene 50% benzene | 10% toluene 90% cyclohexane | 50% toluene 50% benzene | cyclohexane |
| the yield of clean diesel oil, % | 52.16 | 50.67 | 49.38 | 54.42 | 46.25 | 50.89 | 51.25 | 48.65 | 47.18 |
| the PAHs content in the clean diesel oil, wt % | 3.25 | 2.25 | 2.08 | 4.25 | 1.03 | 2.49 | 2.32 | 1.95 | 1.15 |
| the PAHs removal rate, % | 81.80 | 87.40 | 88.35 | 76.20 | 94.23 | 86.06 | 86.42 | 88.49 | 75.65 |
| the aromatic content of PAHs, wt % | 86.85 | 89.06 | 90.27 | 83.42 | 92.18 | 89.33 | 89.52 | 90.56 | 84.26 |

We claim:

1. A method for a simulated moving bed to adsorb and separate polycyclic aromatic hydrocarbons, comprising the following steps:
   1) pretreating diesel oil with impurities in an adsorption column firstly; and removing an amount of colloid, sulfide, nitride and other impurities under the operation conditions which are a pressure of about 0.1 to 1.5 MPa and a temperature of about 30 to 150° C. to obtain purified diesel, wherein an adsorbent in pretreatment process is one selected from the group consisting of X zeolite, Y zeolite, silica colloid, alumina and metal-modified adsorbent;
   2) flowing the purified diesel into simulated moving bed adsorption equipment in which PAHs adsorbent is loaded, wherein the PAHs adsorbent is MCM-41, silica gel, alumina or metal-modified adsorbent having ability of adsorbing the PAHs; and wherein the metal used for modification is at least one selected from the group consisting of Mg, Ba, Al, K, Cu, Ag, Cr, Zn, Co and Ni; and wherein the simulated moving bed adsorption equipment is structured with multiple adsorption beds in series, and these adsorption beds are connected with circulating pump to form a closed loop; these adsorption beds are divided into four areas, which are an adsorption zone, a separation zone, a regeneration zone and a refinement zone; the bed allocated numbers for each zone is not less than 1, and the allocation proportions of each zone are the same or not;
   3) flowing the purified diesel into the adsorption zone, the separation zone, the regeneration zone and the refinement zone;
      in the adsorption zone, PAHs adsorbent is employed to absorb the PAHs so as to produce clean diesel oil;
      in the regeneration zone, desorbent is employed to displace the PAHs out of adsorbent so as to regenerate the adsorbent;
      the adsorption zone and the regeneration zone are separated with the separation zone; and
      in the refinement zone, a product of the diesel oil with the impurities is purified;
   4) setting six material stream pipelines and corresponding automatic control valves in every bed of the simulated moving bed, wherein the six material stream pipelines are included in the every bed of the simulated moving bed, and switching on the valves on material stream pipelines periodically of the adsorption zone, the separation zone, the regeneration zone and the refinement zone to output the clean diesel oil, the PAHs, and the product, respectively, such that continuous adsorption-regeneration process in the simulated moving bed is achieved, wherein
   the six material stream pipelines correspond respectively to a raw material of the diesel oil, the desorbent, the clean diesel oil component, the PAHs, circulated component and washing component;
   the desorbent is recycled from the product with distillation, and final products including the clean diesel oil and the PAHs are obtained; and
   the desorbent is one or more of cyclohexane, methylcyclohexane, xylene, toluene, benzene and ethanol.

2. The method for the simulated moving bed to adsorb and separate polycyclic aromatic hydrocarbons according to claim 1, wherein switching valves have a cycle and the cycle of switching valves is 50 to 2000 seconds.

3. The method for the simulated moving bed to adsorb and separate polycyclic aromatic hydrocarbons according to claim 2, wherein the cycle of switching valves is 100 to 1500 seconds.

4. The method for the simulated moving bed to adsorb and separate polycyclic aromatic hydrocarbons according to claim 1, wherein the operation conditions are a temperature of about 40 to 120° C. and a pressure of about 0.3 to 1.0 MPa; and an adsorption weight hourly space velocity is 0.5 to 1.5 $h^{-1}$.

5. The method for the simulated moving bed to adsorb and separate polycyclic aromatic hydrocarbons according to claim 1, wherein the adsorption beds of the simulated moving bed adsorption equipment have a temperature and the temperature of the adsorption beds is 30 to 200° C.; the adsorption beds have an adsorption pressure and the adsorption pressure is 0.1 to 2.0 MPa; a mass velocity ratio of raw diesel oil to desorbent is 1:1 to 1:3; and a mass velocity ratio of raw diesel oil to circulation is 1:0.8 to 1:4.

6. The method for the simulated moving bed to adsorb and separate polycyclic aromatic hydrocarbons according to claim 1, wherein the adsorption beds of the simulated moving bed adsorption equipment have a temperature and the temperature of the adsorption beds is 40 to 150° C.; the adsorption beds have a adsorption pressure and the adsorption pressure is 0.5 to 1.5 MPa; a mass velocity ratio of raw diesel oil to desorbent is about 1:1.2 to 1:2.5; and a mass velocity of raw diesel oil to circulation is 1:1 to 1:3.

* * * * *